US011604538B2

(12) United States Patent
Hungerford et al.

(10) Patent No.: US 11,604,538 B2
(45) Date of Patent: *Mar. 14, 2023

(54) ELECTRIC FIELD TOUCHSCREEN

(71) Applicant: ChargePoint, Inc., Campbell, CA (US)

(72) Inventors: Matthew Thomas Hungerford, San Jose, CA (US); Robert M. Khamashta, Campbell, CA (US)

(73) Assignee: CHARGEPOINT, INC., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/249,824

(22) Filed: Mar. 15, 2021

(65) Prior Publication Data

US 2021/0271341 A1    Sep. 2, 2021

Related U.S. Application Data

(63) Continuation of application No. 16/297,396, filed on Mar. 8, 2019, now Pat. No. 10,949,021.

(51) Int. Cl.
G06F 3/041    (2006.01)
G06F 3/044    (2006.01)

(52) U.S. Cl.
CPC ............ G06F 3/0418 (2013.01); G06F 3/044 (2013.01)

(58) Field of Classification Search
CPC ......... G06F 3/0416; G06F 2203/04103; G06F 3/0488; G06F 3/044
See application file for complete search history.

(56) References Cited

U.S. PATENT DOCUMENTS 6,597,238 B1 * 7/2003 Matsumoto .......... H04B 17/318
375/317
6,825,833 B2    11/2004 Mulligan et al.
(Continued)

FOREIGN PATENT DOCUMENTS

EP         3360254 A1    8/2018
WO    2018/067613 A1    4/2018

OTHER PUBLICATIONS

GestIC Design Guide, 2013-2016 Microchip Technology Inc., DS40001716C, Apr. 11, 2016, 53 pages.
(Continued)

*Primary Examiner* — William Lu
(74) *Attorney, Agent, or Firm* — Nicholson De Vos Webster & Elliott LLP

(57) ABSTRACT

An electric field (e-field) touchscreen is described. A continuous stream of digital signal data that represents e-field signal deviations is received from multiple receive electrodes. The stream of digital signal data is processed using a machine learning model to determine a touch event and a location on a display screen of the touchscreen. The touch event is processed. The e-field touchscreen may determine whether a non-normal event may be occurring causing noise in the digital signal data. If so, the received stream of digital signal data is processed through a low-pass filter and processed through an absolute value average baseline filter. A difference between the filtered data is determined to generate a filtered stream of digital signal data and is processed using the machine learning model determine a touch event and a location on a display screen of the touch event. The touch event is processed.

19 Claims, 4 Drawing Sheets

(56) References Cited

U.S. PATENT DOCUMENTS

| | | | |
|---|---|---|---|
| 8,294,687 B1 | 10/2012 | Ksondzyk | |
| 8,373,679 B2 | 2/2013 | Gepner et al. | |
| 9,665,725 B2* | 5/2017 | Curtis | G06F 3/046 |
| 10,579,145 B2* | 3/2020 | Gustin | G06F 3/016 |
| 2005/0281320 A1* | 12/2005 | Neugebauer | H04B 1/7075 |
| | | | 375/141 |
| 2007/0078354 A1* | 4/2007 | Holland | A61B 5/318 |
| | | | 600/509 |
| 2010/0220064 A1* | 9/2010 | Griffin | G06F 3/0418 |
| | | | 345/173 |
| 2010/0277417 A1* | 11/2010 | Sarasmo | G06F 3/045 |
| | | | 345/173 |
| 2011/0115717 A1* | 5/2011 | Hable | G06F 3/044 |
| | | | 345/173 |
| 2011/0169781 A1* | 7/2011 | Goertz | G06F 3/0421 |
| | | | 345/175 |
| 2013/0257790 A1* | 10/2013 | Chen | G06F 3/0418 |
| | | | 345/174 |
| 2013/0339418 A1* | 12/2013 | Nikitin | H03H 11/1256 |
| | | | 708/819 |
| 2014/0073861 A1* | 3/2014 | Rodriguez-Llorente | |
| | | | A61B 5/7264 |
| | | | 600/301 |
| 2014/0073872 A1* | 3/2014 | Rodriguez-Llorente | |
| | | | A61B 5/7203 |
| | | | 600/301 |
| 2014/0073964 A1* | 3/2014 | Rodriguez-Llorente | |
| | | | A61B 5/0205 |
| | | | 600/479 |
| 2014/0354583 A1* | 12/2014 | Tokutake | G06F 3/0488 |
| | | | 345/174 |
| 2014/0365009 A1* | 12/2014 | Wettels | B25J 13/082 |
| | | | 700/258 |
| 2015/0091594 A1* | 4/2015 | Hamilton | G06N 3/02 |
| | | | 324/754.21 |
| 2015/0301577 A1* | 10/2015 | Leigh | G06F 3/0383 |
| | | | 345/174 |
| 2016/0054850 A1 | 2/2016 | Aubauer et al. | |
| 2016/0216794 A1* | 7/2016 | Yoon | G06F 3/0416 |
| 2017/0123519 A1* | 5/2017 | Reitan | G06F 3/0441 |
| 2017/0285866 A1 | 10/2017 | Heim et al. | |
| 2018/0188922 A1 | 7/2018 | Dorfner | |
| 2018/0210582 A1 | 7/2018 | Kim et al. | |
| 2018/0288386 A1* | 10/2018 | Lazarow | H04N 13/128 |
| 2019/0227667 A1* | 7/2019 | Harrison | G06F 3/046 |
| 2019/0287311 A1* | 9/2019 | Bhatnagar | G01S 17/89 |
| 2020/0285342 A1* | 9/2020 | Hungerford | G06F 3/04182 |
| 2021/0228103 A1* | 7/2021 | Richter | G06K 7/10366 |

OTHER PUBLICATIONS

International Search Report and Written Opinion, PCT App. No. PCT/US2020/021481, dated Jul. 1, 2020, 11 pages.

MGC3030/3130 3D Tracking and Gesture Controller Data Sheet, 2012-2017 Microchip Technology Inc., Advance Information, DS40001667E, Jul. 13, 2017, 50 pages.

Non-Final Office Action, U.S. Appl. No. 16/297,396, dated Jun. 24, 2020, 19 pages.

Notice of Allowability, U.S. Appl. No. 16/297,396, dated Nov. 12, 2020, 9 pages.

Zhou et al., "AuraSense: Enabling Expressive Around-Smartwatch Interactions with Electric Field Sensing", , Oct. 16-19, 2016, 6 pages.

Supplementary European Search Report and Search Opinion, EP App. No. 20769829.1, dated Nov. 29, 2022, 8 pages.

* cited by examiner

| PROTECTIVE SHIELD 320 | | |
|---|---|---|
| Rx ELECTRODE 315 | | Rx ELECTRODE 315 |
| INSULATOR 312 | | |
| TRANSMIT ELECTRODE 310 | | |
| INSULATOR 308 | | |
| LCD 305 | | |

ELECTRIC FIELD TOUCHSCREEN

CROSS-REFERENCE TO RELATED APPLICATIONS

This application is a continuation of U.S. application Ser. No. 16/297,396, filed Mar. 8, 2019, which is hereby incorporated by reference.

FIELD

Embodiments of the invention relate to the field of touchscreens, and more specifically, to an electric field touchscreen.

BACKGROUND

Touchscreens are commonplace in everyday life. Touchscreens are used in many devices such as mobile devices, personal computers, point-of-sale systems, automated teller machines, etc. There are a variety of technologies to implement touchscreen technology.

One kind of touchscreen is a resistive touchscreen. Resistive touchscreens are made of several layers where the outer layer, when pressed down by an object such as a fingertip or stylus, contacts with a lower layer. The position of the point of pressure on the screen can then be determined. Since resistive touchscreens work on pressure, they can be used by people wearing gloves or using other inanimate objects such as a non-capacitive stylus. Resistive touchscreens are typically more prone to damage than other types of touchscreens. Resistive touchscreens require calibration over time (due to wear and other events). Resistive touchscreens wear down over time developing dead spots in places of frequent use.

Another type of touchscreen is an infrared touchscreen that uses light (typically emitted by light emitting diodes) to generate a matrix and sensors to identify when the plane of the matrix is broken by an object (such as a finger). The light emitting diodes of a touchscreen will burn out and an infrared touchscreen is impacted by sunlight, dust, dirt, and precipitation.

Another type of touchscreen is a capacitive touchscreen. Generally capacitive touchscreens are made with glass that is back-bonded with transparent conductive materials providing a field of electrically addressable matrix of rows and columns for detection. When the screen is touched with a conductive/capacitive object (such as a finger), there results a measurable change in capacitance in the screen's field that is measured as a change in capacitance. The proximity, reach, or depth of field for capacitive sensor technologies is limited to no more than 4 mm (differential mode). Moreover, the sensor field must be bonded and mounted behind 3 mm (e.g., outside kiosk, ATM, etc.) of reinforced touchscreen materials, such as glass and/or polycarbonate. Due this transparent mount thickness the limited proximity range/depth of capacitor sensing is comprised to where it cannot support gloved fingers, long fingernails, and whenever ice and snow builds up on the display screen). Most mobile device touchscreens are capacitive touchscreens because they must be thin materials.

Both resistive and capacitive touchscreens are subject to vandalism since the screen is directly exposed to the user and the sensor field must have intimate contact (direct exposure) at the user interface.

The type of touchscreen technology that is used on a device depends in large part on the purpose of that device. What is appropriate for a smartphone may not be appropriate for a device that is expected to be used in the elements, such as an automated teller machine, a gas station pump, or an electric vehicle charging station. For instance, touchscreens that are bonded to glass can be easily cracked or damage if they are hit by hail, a rock kicked off the ground by a car tire, or other wind-strewn sticks and other materials. Also, the bonding utilized in attaching touchscreens to glass does not handle (e.g., delaminate and discolor) large changes in temperature or direct UV exposure over a long period of time well. As touchscreen size grows, the amount of pressure to cause glass to crack lessens, thereby making large touchscreens made of glass unlikely to last long without damage.

Electric field (E-Field) technology has been used to support 3-dimensional (X, Y, & Z) gesture detection and motion tracking. An E-field is generated by electrical charges and spread along a surface carrying the charge. The E-field becomes distorted when an object, such as a finger or a hand, enters the E-field area, and the object's position relative to the sensing area can be determined. The signals of e-field technology may be impacted by precipitation including rain.

Although E-field technology can be used to support gesture detection, typical E-field technology does not work well for touchscreen operation. Conventional E-field technology registers gestures several feet from the receive electrodes. Typical E-field technology does not detect the point of contact (Z-direction) on the screen but rather detects the approach of the object on the electric field being emitted. This distortion may include, for example, the user's entire finger and a portion of their hand. Since users use touchscreens in different ways (e.g., some use a thumb or pinky, some extend their finger up keeping their wrist below, some hold their hand sideways), simple algorithms to detect an XY location are not accurate because they do not account for different usage patterns. Further, hand sizes are different, so the size of impact varies greatly.

SUMMARY

An electric field touchscreen is described. The electric field (e-field) touchscreen includes a set of one or more transmit electrodes that are configured to generate an e-field, and a plurality of receive electrodes that are each configured to sense an e-field variance. A controller continuously receives signal data from the plurality of receive electrodes and outputs a stream of digital signal data that represents e-field signal deviations. An application processor receives the stream of digital signal data and process the stream of digital signal data using a machine learning model to determine a touch event and location on a display of the touchscreen. The touch event is then processed.

In an embodiment, the application processor determines whether a non-normal event may be occurring that causes noise in the digital signal data. For instance, signal strength may drop below a threshold that may indicate that a non-normal event may be occurring (e.g., heavy rain or other precipitation) that could lead to a false touch event occurring and/or degradation or loss of actual touch events. If the signal strength drops below the threshold, further filtering of the data occurs. Baseline calibration for the stream of digital signal data is disabled, and the stream of digital signal data is passed through a low-pass filter to generate a first filtered stream of digital signal data and passed through an absolute value average baseline filter. A difference between the first filtered stream of digital signal data absolute value average is made to generate a second filtered stream of digital signal data. The second filtered stream of digital signal data is processed using the machine learning model to determine a touch event and a location on the display of the touchscreen. The touch event is then processed.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

An electric field (e-field) touchscreen is described. The e-field touchscreen includes multiple e-field receive electrodes located towards the edge of the display. For instance, if the form of the touchscreen is rectangular, there may be one e-field receive electrodes (e.g., an antenna) located along each edge of the display. The display may be covered with a polycarbonate material. A machine learning (ML) algorithm may be used to translate e-field data to touch position coordinates (e.g., an X and Y coordinate and whether a touch is registered). The touch data is provided to the application for touch enabled processing. The e-field touchscreen may detect certain conditions that could lead to a false touch event and/or degradation or loss of actual touch events, and mitigate such conditions.

Figure 1:
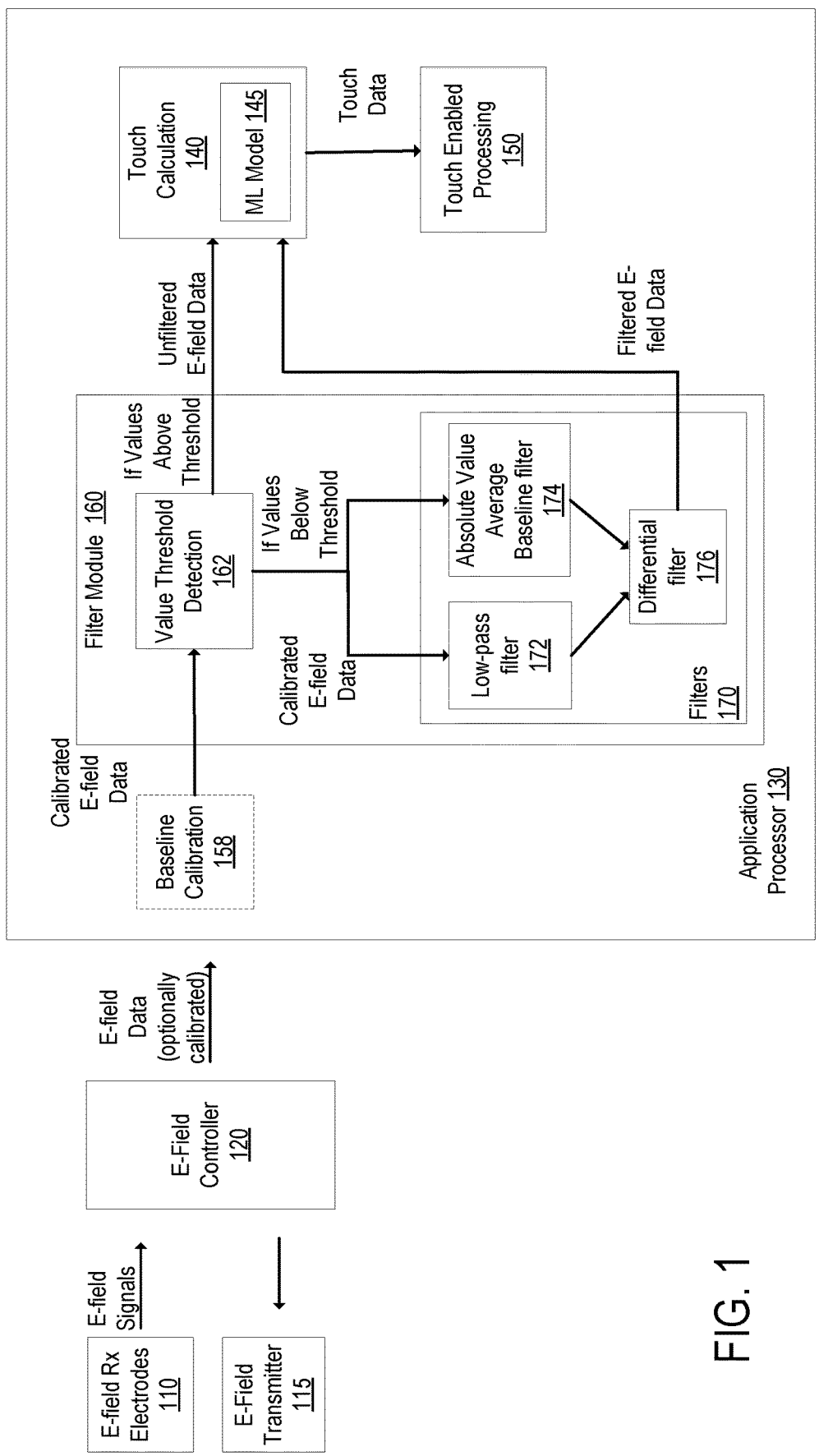
FIG. 1 illustrates a system for an e-field touchscreen according to an embodiment.

FIG. 1 illustrates a system for an e-field touchscreen according to an embodiment. The e-field controller 120 includes an analog front end that interfaces with the e-field receive electrodes 110 and the e-field transmitter 115. For instance, the e-field controller 120 provides a transmit signal to the e-field transmitter 115 to generate an e-field and receives the analog signals from the e-field receive electrodes 110 that sense the e-field variance. The e-field transmitter 115 may include a transmit electrode (that may be located on a layer behind the layer of the receive electrodes) and a conductive side of an indium oxide (ITO) material over the entire display region that is electrically bonded to the transmit electrode. The transmit electrode may be a non-transparent copper ring around the perimeter of the display, and the ITO material is transparent over the entire display region. The transmit electrode to ITO connection improves the overall e-field transmitter and provides a more uniform e-field. This improves the accuracy at the center of the display where touch proximity accuracy can be compromised.

The number, shape, and/or placement of the e-field receive electrodes may depend on the form factor of the display and/or the expected use of the touchscreen. For instance, in cases of a rectangular display where touch can be expected anywhere on the display, there may be four receive electrodes that are located around the edges of the display respectively. As another example, if touch was expected only in a specific part of the display (e.g., on the X axis), there may be less than four receive electrodes (e.g., two receive electrodes at the left/right of the display). As another example, if the display is circular shaped, the receive electrodes may be curved along different portions of the edge of the display.

In a specific embodiment, the e-field receive electrodes 110 includes four receive electrodes (e.g., antennas) that are located around the edge of the display of the touchscreen (e.g., north, east, south, and west), and may be located on a different layer than the display itself or embedded on the edges of the display. The e-field receive electrodes 110 detect e-field variations at different positions relative to the display that are used when measuring the origin of the electric field distortion from the various signals.

Figure 2:
FIG. 2 shows an example of the placement of receive electrodes in relation with the screen of the display according to an embodiment.

FIG. 2 shows an example of the placement of the electrodes of the e-field touchscreen according to an embodiment. The shape of the display screen in FIG. 2 is rectangular. As shown in FIG. 2, there are four receive electrodes 210A-210D that are located around the edge of the display screen. The receive electrodes 210A-210D may be antennas and may be made from copper. The receive electrode 210A may be referred to as the north electrode, the receive electrode 210B may be referred to as the east electrode, the receive electrode 210C may be referred as the south electrode, and the receive electrode 210D may be referred to as the west electrode. The transmit electrode 215A (e.g., a copper ring) is located around the edge of the display, and a conductive side of an ITO material 215B that is electrically bonded to the transmit electrode 215 (that together generate the e-field) is located above the LCD display screen and below the protective shield. The generated e-field is along the entire region of the display. The transmit electrode 215A and conductive ITO material 215B are located in a layer behind the receive electrodes 210A-210D. The shape and size of the receive electrodes may be different than shown in FIG. 2. For instance, the receive electrodes may not extend to the edge of each side of the display screen. As another example, the receive electrodes 210 may be the same size relative to each other or may be a size relative to the size/ratio of the screen.

Figures 3, 4:
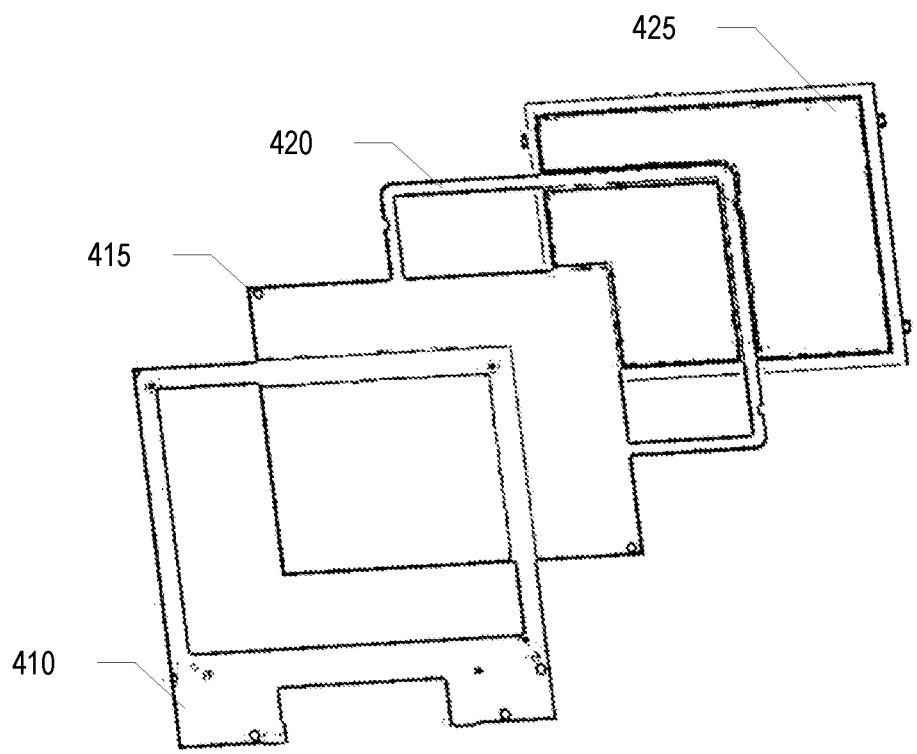
FIG. 3 shows a cross section of the touchscreen assembly according to an embodiment.
FIG. 4 is an exploded view of the touchscreen assembly according to an embodiment.

FIG. 3 shows a cross section of the touchscreen assembly according to an embodiment. The liquid crystal display (LCD) 305 is at the bottom layer of the touchscreen assembly. An insulator 308 separates the LCD 305 and the transmit electrode 310 (that may include a copper ring and conductive ITO material). The insulator 308 may be a non-conductor/insulator material of 5 mm thickness, for example. The insulator 312 separates the receive electrodes 315 and the transmit electrode 310. The insulator 312 may be a non-conductor/insulator material of at least 1.35 mm thick. At the top of the touchscreen assembly layer is the protective shield 320 (e.g., a polycarbonate material).

FIG. 4 is an exploded view of the touchscreen assembly according to an embodiment. The part 410 is a printed circuit board combining outward (user facing) e-field receive electrodes 110 on the top side, and the e-field transmitter 115 on the bottom side (a top to bottom insulation distance is at least 1.3 mm, for example). The part 410 is attached to the part 415 which is a transparent conducting thin oxide material (e.g., an indium oxide (ITO) material). The part 420 provides the insulator separation between the LCD display 425.

Referring back to FIG. 1, the e-field controller 120 processes the raw analog signals from the e-field receive electrodes 110 digitally in a signal processing unit (SPU) to generate signal data for the measured electric fields that represent signal strength. The SPU may perform digital signal processing. In an embodiment, the e-field controller 120 performs a calibration process on the incoming data to determine the baseline of the data (what the data is expected without distortion of the e-field). The calibration process may be performed continually. In another embodiment, the calibration process is performed by the application processor 130 instead of the e-field controller 120. For instance, the baseline calibration 158 may be performed in an embodiment when the e-field controller 120 does not provide a calibrated baseline of the data. In an embodiment, the e-field controller 120 generates signal data that is signal deviation values that may be receiver signal sensitivity amplified by receiver gain.

The e-field controller 120 outputs the digital signal data to be processed by the application processor 130. The application processor 130 processes the digital signal data to determine when a touch event occurs on the display and the location of the touch event (e.g., X and Y coordinates). Certain non-normal events can cause noise in the data where it can be difficult to discriminate touch data from noise. For instance, precipitation (e.g., heavy rain) increases the peak of the touch signal level while also filling in the signal troughs where touch and no-touch is discriminated. In an embodiment, the application processor 130 applies noise specific adaptive filters to discriminate touch data from noise data. In such an embodiment, the application processor 130 executes the filter module 160 to determine if filtering the data is needed to address non-normal events that could lead to false touch events being registered and/or degradation or loss of actual touch events.

The filter module 160 includes the value threshold detection 162 to detect if the digital signal data has dropped below a threshold that indicates a possibility that a non-normal event is occurring (e.g., rain, environmental events, etc.) that could lead to a false touch being registered and/or degradation or loss of actual touch events. For instance, rain or other precipitation may be causing the signal values to significantly drop and cause a false touch event to be registered and/or degrade or lose signal values of actual touch events. The value of the threshold may be determined through empirical analysis. If the digital signal data is above the threshold, then the application processor 130 operates in "normal" mode and a touch calculation module 140 that uses a machine learning model 145 to determine if a touch event occurs and the location of such a touch event. If the digital signal data is below the threshold (which is indicative that a non-normal event is occurring), the application processor 130 operates in a "filtered touch" mode and performs one or more filters on the digital signal data to mitigate against the non-normal events by removing distortion. While in filtered mode, the value threshold detection 162 may be periodically executed and if the digital signal data exceeds the threshold for a predefined time (e.g., X number of seconds), the application processor 130 reverts back to operating in normal mode.

In an embodiment, while in filtered mode, the filter module 160 disables the calibration process that determines the baseline of the data. This prevents the signals received during filtered mode from becoming a new normal/baseline. If the e-field controller 120 performs the calibration, the filter module 160 causes a command to be sent to the e-field controller 120 to stop performing the calibration. If the application processor 130 performs the calibration, the filter module 160 causes the application processor 130 to disable the calibration process.

When in filtered mode, the filter module 160 processes the digital signal data through one or more filters 170 to remove distortion in the signal data. As illustrated in FIG. 1, the filters include a low-pass filter 172, an absolute value average baseline filter 174, and a differential filter 176. The filter module 160 may process the digital signal data through the low-pass filter 172 and the absolute value average baseline filter 174 concurrently or substantially concurrently. The filtered data from one of the filters is not input into the other filters. Instead, the low-pass filter 172 and the absolute value average baseline filter 174 independently are applied to the same digital signal data.

The low-pass filter 172 passes data signals that have a frequency lower than a predefined cutoff frequency and attenuates data signals that have a frequency higher than the predefined cutoff frequency. The predefined cutoff frequency may be determined empirically and may be different depending on the environment in which the touchscreen is to be used. By way of example, the data signals from heavy rain may resemble a sine wave that has periodic oscillation (alternating between high and low values due the rain reflecting signals and absorbing signals). The low-pass filter 172 smooths the data signals to slow down the frequency of change.

The absolute value average baseline filter 174 determines the average of the absolute values of the data signals when in filtered mode. This baseline is not the baseline when in normal mode but rather represents the baseline (of absolute values) of the data signals during the filtered mode. However, in an embodiment where the e-field controller 120 does not provide calibrated e-field data, the absolute value average baseline filter 174 may run at all times (even when not in filtered mode) to provide a baseline value for the touch calculation.

The output of the low-pass filter 172 and the output of the absolute value average baseline filter 174 are input to the differential filter 176. The differential filter 176 subtracts the absolute value average baseline as determined by the absolute value average baseline filter 174 from the results of the low-pass filter 172 to produce filtered data signals. The filtered data signals are then provided to the touch calculation module 140 to determine if a touch event occurs and the location of such a touch event.

In an embodiment, the touch calculation module 140 uses the machine learning model 145 on the signal data (either the unfiltered data signals when operating in normal mode or the filtered data signals when operating in filtered mode) to determine if a touch event occurred and the location of such a touch event. For instance, the machine learning model 145 may be a neural network model that maps the data signals to XY touch positions. The machine learning model 145 may use a deep neural network (DNN) regressor estimator to train a regression model to predict the location (X and Y coordinate) and may use a DNN classifier estimator to train a classifier model to predict if a touch event has occurred. The machine learning model 145 may have features that correspond with the e-field receive electrodes 110 (e.g., a north, east, west, and south features). The machine learning model 145 may be implemented by a compiled language (e.g., C or C++) to provide high performance real-time predictions of a user's input to control the user interface on the display.

The machine learning model 145 may be trained through a diverse group of users using the display while the data signals are captured along with additional sensors (e.g., infrared sensors) providing the target locations. The machine learning model can be trained to recognize human touch at certain x, y positions, allowing the trained model to be able to discern touches and discard other data. Further, the machine learning model may be trained with other interactions that are not touch events, allowing the prediction model to recognize they are not to be recognized at touch events.

The touch data is then applied to the touch enabled processing 150 (e.g., a touch event with the X and Y coordinate). The touch enabled processing 150 processes the touch data (e.g., according to its definitions in the UI that is being displayed). For instance, the touch event may be to control/interact with the user interface being displayed.

Unlike conventional e-field technology that can be used to support gesture detection, the e-field touchscreen described herein allows for accurate touchscreen operation. The e-field touchscreen, through use of the machine learning model, accurately detects a touch event and its position versus detecting the entire impact of the object (e.g., the hand) on the electric field. This allows the e-field touchscreen to be used differently by different users (e.g., different fingers, different hand placement, different hand sizes, etc.). Also, users wearing gloves can use the e-field touchscreen accurately.

Further, since the display may be protected with a polycarbonate material instead of glass, the e-field touchscreen is durable and may protect against rocks, hail, baseball bats, etc. Since the touchscreen is not bonded to glass (which conventionally suffers in direct sunlight, heat, or drastic temperature changes), the e-field touchscreen can be used in outdoor conditions for years even when exposed to high temperatures, low temperatures, snow, ice, and/or direct sunlight. This allows the e-field touchscreen to be incorporated in outdoor devices (e.g., an automated teller machine (ATM), an electric vehicle charging station, a gas station pump, or outdoor kiosks or other outdoor devices).

Also, unlike conventional touchscreen technologies that fail or poorly handle when there is foreign material on the display (e.g., ice, snow, dirt, mud that can physically obstruct the use of the touchscreen), the e-field touchscreen described herein can be accurately used with limited amounts of foreign material on the display (e.g., ⅛ inch of ice on top of the display) and works accurately when there is snow/ice around the edge or on the display.

Figure 5:
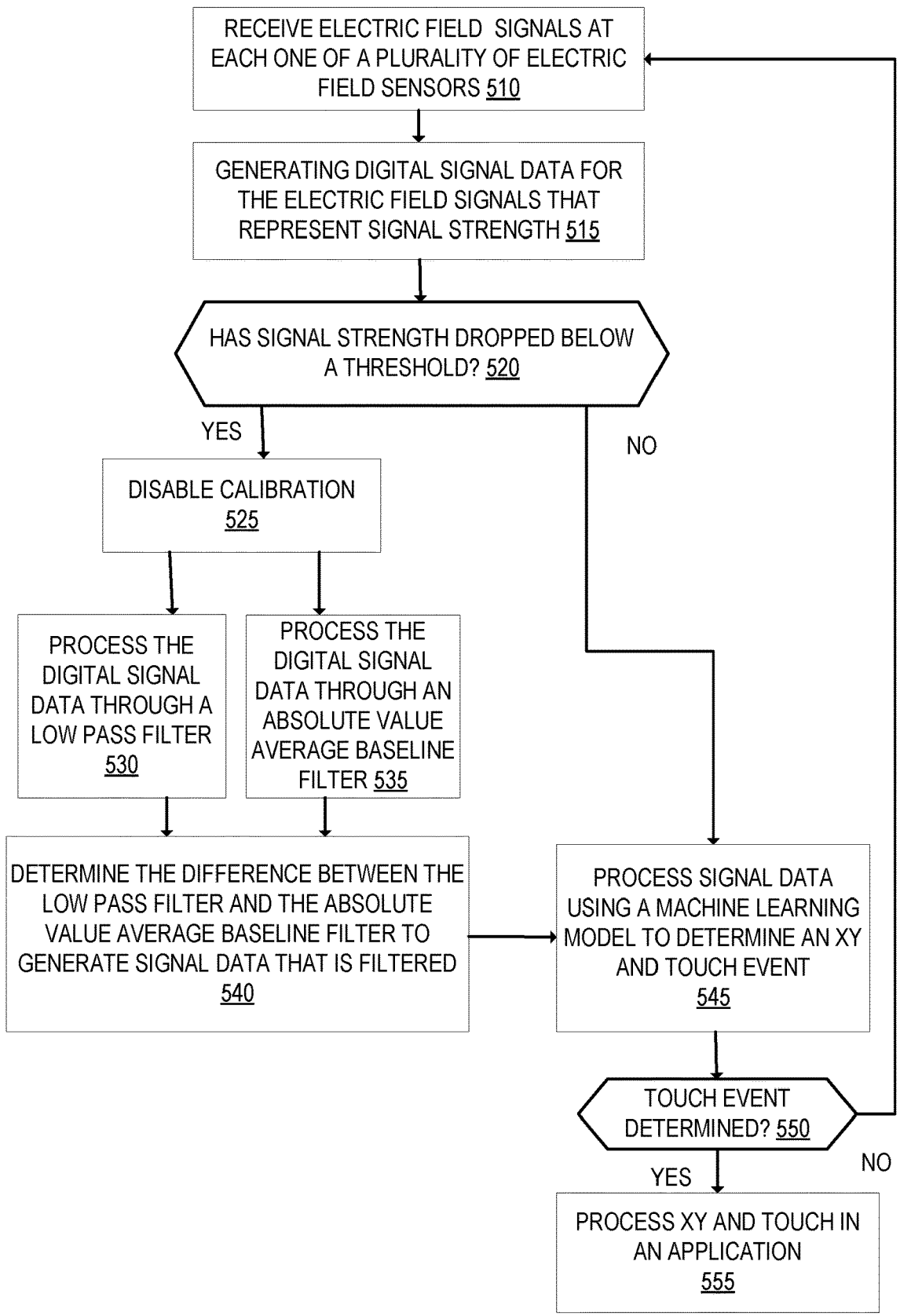
FIG. 5 is a flow diagram that illustrates exemplary operations for determining touch events implemented on an e-field touchscreen according to an embodiment.

FIG. 5 is a flow diagram that illustrates exemplary operations for determining touch events implemented on an e-field touchscreen according to an embodiment. The operations of FIG. 5 are described with reference the embodiment shown in FIG. 1. However, the embodiment shown in FIG. 1 can perform operations different than those in FIG. 5, and the operations in FIG. 5 can be performed by embodiments different than that shown in FIG. 1.

At operation 510, the e-field controller 120 receives electric field signals from each of the e-field receive electrodes 110. These signals represent the variance in the e-field that are sensed by the e-field receive electrodes 110. To generate the e-field, the e-field controller 120 causes an e-field transmitter 115 to generate the e-field that spreads along a surface of the display. The e-field transmitter 115 may include a transmit electrode (that may be located on a layer behind the layer of the receive electrodes) and a conductive side of an ITO material over the entire display region that is electrically bonded to the transmit electrode. The transmit electrode may be a non-transparent copper ring around the perimeter of the display, and the ITO material is transparent over the entire display region. The ITO material may be a low-pressure vapor disposition (a vacuum chamber using electrostatic field with an energized ingot of material/source) of a lightly conductive material such as silver oxide. The transmit electrode to ITO connection improves the overall e-field transmitter and provides a more uniform e-field. This improves the accuracy at the center of the display where touch proximity accuracy can be compromised. The e-field receive electrodes 110 may include four receive electrodes (e.g., antennas) that are located around the edge of the display of the touchscreen (e.g., north, east, south, and west), and may be located on a different layer than the display itself or embedded on the edges of the display.

Next, at operation 515, the e-field controller 120 generates digital signal data for the received electric field signals that represents signal strength. The e-field controller 120 may perform a calibration process on the electric field signals to determine the baseline of the data. The digital signal data that is generated may be signal deviation values defined as the receiver signal sensitivity amplified by receiver gain. The generated digital signal data is processed by the application processor 130 to determine if a touch event has occurred and if so the location of the touch event.

At operation 520, the application processor 130 determines if the signal strength (represented in the digital signal data) has dropped below a threshold that indicates that a possibility of a non-normal event is occurring, and further filtering of the data is warranted. This non-normal event may cause a false touch or other inaccuracy of the e-field touchscreen operation. The non-normal event may occur because of heavy rain or other environmental factors. For instance, heavy precipitation may cause the signal strength to significantly drop below the threshold and can lead to false touch(es) being registered and/or degradation or loss of actual touch events. If the signal strength has dropped below the threshold, then operation 525 is performed. Operations 525-540 are performed as part of a filtered mode. If the signal strength is not below the threshold, then operation 545 is performed.

At operation 525, the application processor 130 disables baseline calibration of the electric field signals. If the e-field controller 120 is performing the baseline calibration, the application processor 130 sends a command to the e-field controller 120 to disable the baseline calibration. If the application processor 130 is performing the baseline calibration, it ceases to perform the calibration while the signal strength is below the threshold.

The application processor 130 processes the digital signal data through one or more filters 170 to remove distortion in the signal data. For instance, at operation 530, the application processor 130 processes the digital signal data using a low-pass filter 172 that passes data signals that have a frequency lower than a predefined cutoff frequency and attenuates data signals that have a frequency higher than the predefined cutoff frequency.

Concurrently (or substantially concurrently) with operation 530, the application processor 130 at operation 535 processes the digital signal data using an absolute value average baseline filter 174. The absolute value average baseline filter 174 determines the average of the absolute values of the digital signal data. This baseline is not the baseline when in normal mode but rather represents the baseline (of absolute values) of the data signals during the filtered mode.

Next, at operation 540, the application processor 130 determines the difference between the results of the low pass filter (operation 530) and the results of the absolute value average baseline filter (operation 535) to generate signal data that is filtered. For instance, the differential filter 176 takes the result of the absolute value average baseline filter (operation 535) and subtracts it from the results of the low pass filter (operation 530). The filtered signal data is then processed at operation 545.

At operation 545, the application processor 130 processes the signal data (either the filtered signal data resulting from operation 540 or the signal data received from the e-field controller 120 resulting from operation 515) including using a machine learning model 145 to determine an XY position and a touch event. The machine learning model 145 may be a neural network model that maps the data signals to XY touch positions. The machine learning model 145 may use a deep neural network (DNN) regressor estimator to train a regression model to predict the location (X and Y coordinate) and may use a DNN classifier estimator to train a classifier model to predict if a touch event has occurred.

Next, at operation 550, the application processor 130 determines if a touch event has occurred based on the processed signal data. If a touch event has occurred, then at operation 555 the touch event (including the XY position) is processed in an application that uses touch input. For instance, the touch event may be to control/interact with the user interface being displayed. If a touch event has not occurred, then flow moves back to operation 510.

The e-field touchscreen described can be used for any device that has a touchscreen, including mobile devices (e.g., smartphones, media players), e-readers, personal computing devices (e.g., laptops, tablets, etc.), wearable devices (e.g., fitness trackers, smart watches, etc.), kiosks, automated teller machines, gas station pumps, electric vehicle charging stations, point of sale devices, etc.

Although embodiments have described the application processor applying one or more noise specific adaptive filters to discriminate touch data from noise data, in another embodiment the e-field controller 120 applies the one or more noise specific adaptive filters to discriminate touch data from noise data. For instance, the e-field controller 120 may include a filter module like the filter module 160 that determines if additional filtering of the data is needed to address non-normal events, may use filters similar to the low-pass filter 172, absolute value average baseline filter 174, and differential filter 176, and may transmit the filtered e-field data to the application processor 130. In such an embodiment, the application processor 130 does not include the filter module 160 and instead processes the filtered e-field data received from the e-field controller 120 using a machine learning model to determine a touch event and location on the display.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

In the preceding description, numerous specific details were set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the preceding description and the claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for an electric field (e-field) touchscreen, comprising:
continually receiving a stream of digital signal data that represents e-field signal deviations detected from each of a plurality of receive electrodes, wherein a display screen of the e-field touchscreen includes four edges, and wherein the plurality of receive electrodes includes at least four electrodes located along the four edges of the display screen respectively;

processing the stream of digital signal data using a machine learning model to determine a first touch event and a first location on a display screen of the touchscreen;
processing the first touch event;
determining, from the received stream of digital signal data, that signal strength has dropped below a threshold; and
responsive to the determining that signal strength has dropped below the threshold, performing the following:
processing the received stream of digital signal data through one or more filters to generate a first filtered stream of digital signal data,
processing the first filtered stream of digital signal data using the machine learning model to determine a second touch event and a second location on the display screen of the touchscreen, and
processing the second touch event.

2. The method of claim 1, wherein the machine learning model uses a deep neural network (DNN) regression model to predict locations and uses a DNN classifier model to predict whether touch events have occurred.

3. The method of claim 1, further comprising:
responsive to the determining that signal strength has dropped below the threshold, further performing the following:
disabling baseline calibration for the stream of digital signal data;
wherein processing the received stream of digital signal data through the one or more filters includes:
processing the received stream of digital signal data through a low-pass filter to generate a second filtered stream of digital signal data,
processing the received stream of digital signal data through an absolute value average baseline filter to determine an average of the absolute values of the received stream of digital signal data, and
determining a difference between the second filtered stream of digital signal data and the average of the absolute values of the received stream of digital signal data to generate a second filtered stream of digital signal data.

4. The method of claim 3, further comprising:
determining, from the continually received stream of digital signal data, that signal strength is above the threshold for a predefined amount of time;
responsive to the determining that signal strength is above the threshold for the predefined amount of time, performing the following:
reenabling baseline calibration for the stream of digital signal data;
processing the received digital signal data using the machine learning model to determine a third touch event and a third location on a display screen of the touchscreen; and
processing the third touch event.

5. The method of claim 3, wherein the processing the received stream of digital signal data through the low-pass filter and the processing the received stream of digital signal data through the absolute value average baseline filter are performed concurrently.

6. The method of claim 3, wherein the disabling baseline calibration on the stream of digital signal data includes transmitting a command to an e-field controller to disable baseline calibration.

7. An electric field touchscreen, comprising:
a set of one or more transmit electrodes that are configured to generate an electric field (e-field);
a plurality of receive electrodes that are each configured to sense an e-field variance;
a controller configured to continuously receive signal data from the plurality of receive electrodes and output a stream of digital signal data that represents e-field signal deviations; and
an application processor configured to perform the following:
receive the stream of digital signal data,
process the received digital signal data using a machine learning model to determine a first touch event and a first location on a display screen of the touchscreen,
process the first touch event,
determine, from the received stream of digital signal data, that signal strength has dropped below a threshold; and
responsive to a determination that signal strength has dropped below the threshold, perform the following:
process the received stream of digital signal data through one or more filters to generate a first filtered stream of digital signal data,
process the first filtered stream of digital signal data using the machine learning model to determine a second touch event and a second location on the display screen of the touchscreen, and
process the second touch event.

8. The electric field touchscreen of claim 7, wherein the display screen includes four edges, and wherein the plurality of receive electrodes includes at least four receive electrodes located along the four edges of the display screen respectively.

9. The electric field touchscreen of claim 7, wherein the machine learning model is to use a deep neural network (DNN) regression model to predict locations and is to use a DNN classifier model to predict whether touch events have occurred.

10. The electric field touchscreen of claim 7, wherein the application processor is further configured to perform the following:
responsive to a determination that the signal strength has dropped below the threshold, further perform the following:
disable baseline calibration for the stream of digital signal data,
wherein to process the received stream of digital signal data through the one or more filters includes:
process the received stream of digital signal data through a low-pass filter to generate a second filtered stream of digital signal data,
process the received stream of digital signal data through an absolute value average baseline filter to determine an average of the absolute values of the received stream of digital signal data;
determine a difference between the second filtered stream of digital signal data and the average of the absolute values of the received stream of digital signal data to generate a second filtered stream of digital signal data.

11. The electric field touchscreen of claim 10, wherein the application processor is further configured to perform the following:
determine, from the received stream of digital signal data, whether that signal strength is above the threshold for a predefined amount of time; and responsive to a determination that signal strength is above the threshold for the predefined amount of time, perform the following:
reenable baseline calibration for the stream of digital signal data,
process the received digital signal data using the machine learning model to determine a third touch event and a third location on a display screen of the touchscreen, and
process the third touch event.

12. The electric field touchscreen of claim 10, wherein processing of the received stream of digital signal data through the low-pass filter and processing of the received stream of digital signal data through the absolute value average baseline filter are to be performed concurrently.

13. The electric field touchscreen of claim 10, wherein disablement of baseline calibration on the stream of digital signal data includes a command to be transmitted to the controller to disable baseline calibration.

14. A non-transitory machine-readable storage medium that provides instructions that, if executed by a processor of an electric field (e-field) touchscreen, will cause said processor to perform operations comprising:
continually receiving a stream of digital signal data that represents e-field signal deviations detected from each of a plurality of receive electrodes, wherein a display screen of the e-field touchscreen includes four edges, and wherein the plurality of receive electrodes includes at least four electrodes located along the four edges of the display screen respectively;
processing the stream of digital signal data using a machine learning model to determine a first touch event and a first location on a display screen of the touchscreen;
processing the first touch event;
determining, from the received stream of digital signal data, that signal strength has dropped below a threshold; and
responsive to the determining that signal strength has dropped below the threshold, performing the following:
processing the received stream of digital signal data through one or more filters to generate a first filtered stream of digital signal data,
processing the first filtered stream of digital signal data using the machine learning model to determine a second touch event and a second location on the display screen of the touchscreen, and
processing the second touch event.

15. The non-transitory machine-readable storage medium of claim 14, wherein the machine learning model uses a deep neural network (DNN) regression model to predict locations and uses a DNN classifier model to predict whether touch events have occurred.

16. The non-transitory machine-readable storage medium of claim 14, wherein the operations further comprise:
responsive to the determining that signal strength has dropped below the threshold, further performing the following:
disabling baseline calibration for the stream of digital signal data;
wherein processing the received stream of digital signal data through the one or more filters includes:
processing the received stream of digital signal data through a low-pass filter to generate a second filtered stream of digital signal data,
processing the received stream of digital signal data through an absolute value average baseline filter to determine an average of the absolute values of the received stream of digital signal data, and
determining a difference between the second filtered stream of digital signal data and the average of the absolute values of the received stream of digital signal data to generate a second filtered stream of digital signal data.

17. The non-transitory machine-readable storage medium of claim 16, wherein the operations further comprise:
determining, from the continually received stream of digital signal data, that signal strength is above the threshold for a predefined amount of time;
responsive to the determining that signal strength is above the threshold for the predefined amount of time, performing the following:
reenabling baseline calibration for the stream of digital signal data;
processing the received digital signal data using the machine learning model to determine a third touch event and a third location on a display screen of the touchscreen; and
processing the third touch event.

18. The non-transitory machine-readable storage medium of claim 16, wherein the operations further comprise, wherein the processing the received stream of digital signal data through the low-pass filter and the processing the received stream of digital signal data through the absolute value average baseline filter are performed concurrently.

19. The non-transitory machine-readable storage medium of claim 16, wherein the operations further comprise, wherein the disabling baseline calibration on the stream of digital signal data includes transmitting a command to an e-field controller to disable baseline calibration.

* * * * *